UNITED STATES PATENT OFFICE.

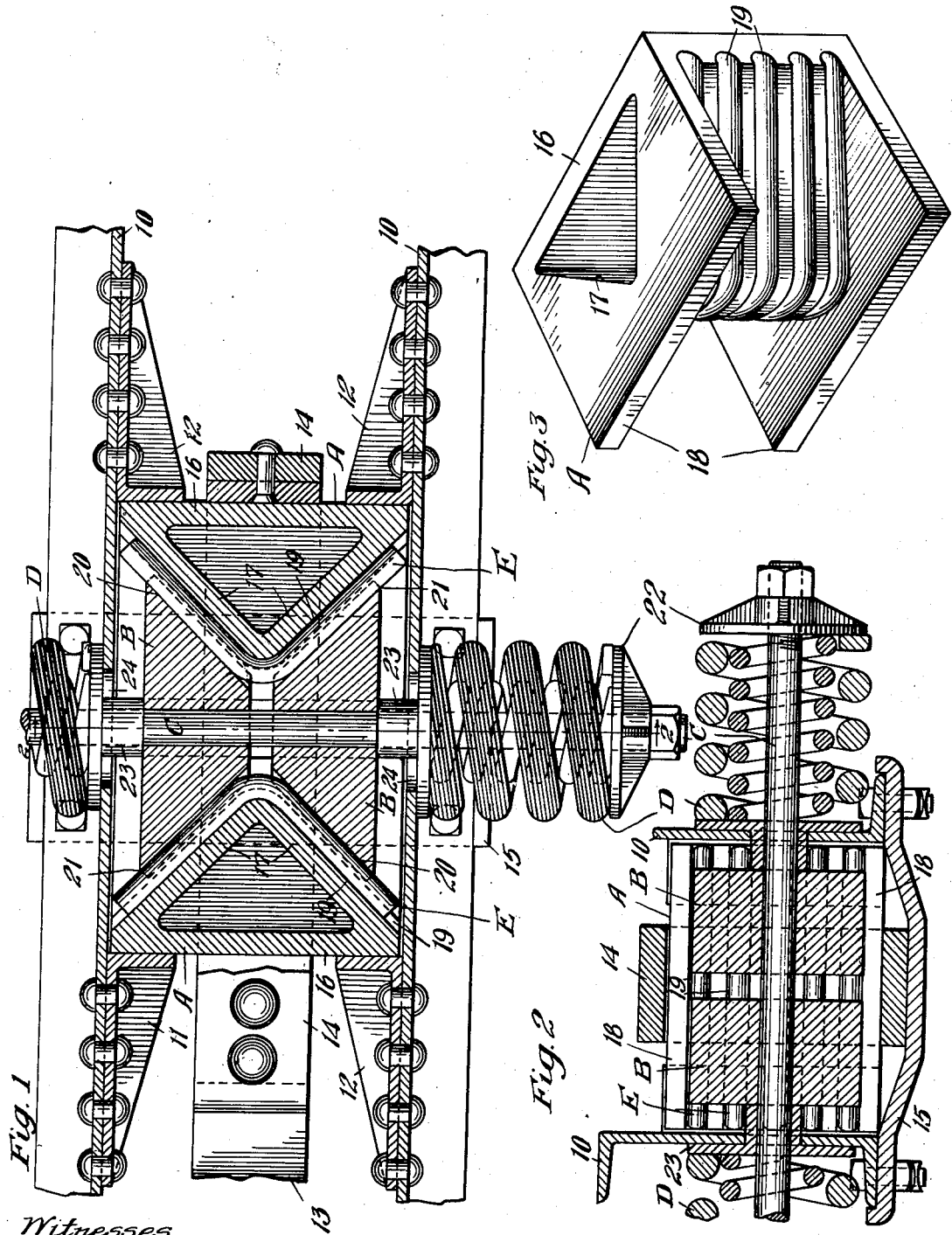

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,374,671.  Specification of Letters Patent.  Patented Apr. 12, 1921.

Application filed October 30, 1919. Serial No. 334,569.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism having contacting wearing friction surfaces of different materials, the parts being so designed that the materials of greater hardness are readily detachable without destructive effect and readily replaceable.

In the drawing forming a part of this specification, Figure 1 is a horizontal sectional view of a portion of a railway draft rigging showing my improvements embodied therein. Fig. 2 is a vertical transverse sectional view taken substantially on the line 2—2 of Fig. 1. And Fig. 3 is a detail perspective of one of the friction elements of the mechanism.

In said drawing, 10—10 denote channel shaped center or draft sills of a railway car, to the inner faces of which are applied front stop lugs 11—11 and rear stop lugs 12—12. A portion of a draw bar is indicated at 13, the same being operatively connected to the shock absorbing mechanism proper by a yoke 14. The parts are supported by a detachable saddle plate 15.

In the drawings I have illustrated one form of friction shock absorbing mechanism for carrying out my invention, although it will be understood by those skilled in the art that the invention may be embodied in other constructions even of radically different form. In the form illustrated, I employ two combined followers and wedges A—A, two laterally movable friction blocks B—B, a transversely extending spring bolt C, transversely arranged springs D—D outside of the sills, and a plurality of hard wearing elements E—E.

Each of the end wedge followers A is preferably cored and has an outer transversely extending wall 16, a pair of diagonally extending walls 17—17 and upper and lower top flanges 18—18. The inner or active faces of the converging walls 17 are provided with a series of horizontally extending grooves 19—19, the same being substantially semi-circular in cross section, as appears from Fig. 3. It will be noted that each of said grooves 19 is continuous from one side edge of the follower A around the angle to the other side edge of the follower. Said grooves 19 accommodate the hard wearing elements E, the latter preferably being in the form of hardened spring steel bars of circular cross section and bent at their centers to an angle corresponding to the included angle between the walls 17—17 of the followers A. As will be understood, the wearing or insert elements E will seat within the grooves 19 and, so long as pressure is applied thereto, said element E cannot slip in any direction with respect to the follower A. By this method the wearing elements E are held in proper position during service while at the same time they are removable without any destructive effect for the purpose of replacement.

The friction blocks B are of similar form and each has inclined end surfaces 20—20, arranged at an angle corresponding to the angles of the walls 17 of the followers A. Said surfaces 20 are provided with grooves 21 in alinement with the grooves 19 so as to accommodate the wearing elements E.

The blocks B are centrally perforated to accommodate the bolt C and the springs D are held on the latter between washers 22 and pressure-transmitting sleeves 23, the latter working within elongated slots 24 in the sills 10, in a well-known manner.

In operation, as either follower A is moved toward the other, it is evident that the blocks B will be forced apart laterally against the action of the springs D. As this action occurs, the surfaces of the blocks B will slide along the wearing elements E and the latter will remain in their proper position during both the compressive and release strokes of the gear. As hereinbefore indicated, the wearing elements E are preferably of hardened spring steel, whereas the blocks B will preferably be made of gray or white iron so as to make the co-acting friction surfaces of different material and thereby obtain greater friction.

From the preceding description, it will be seen that the followers A and blocks B can be manufactured at comparatively small expense in the form of castings and the elements E manufactured from bar steel in stock and replaced from stock material. The entire device is simple and the replacement of the wearing elements E involves a minimum of expense and labor.

Although I have herein shown and described what I now consider the preferred manner of carrying out the invention, the same is merely illustrative and I contemplate all changes and modifications as come within the scope of the claims appended hereto.

I claim:

1. In a friction shock absorbing mechanism, the combination with a friction element having a pair of diverging faces, of wearing inserts having portions extending along both of said diverging faces and thereby held against movement lengthwise of either of said faces, other friction elements having faces inclined to correspond with the diverging faces of said first named friction element, said inclined faces engaging said inserts, and spring means for yieldingly resisting relative movement between said friction elements, each of said inserts being in the form of a bent bar and the opposed faces of the friction elements between which said inserts are interposed having a series of parallelly extending grooves to conform to the cross sections of and receive the bars.

2. In a friction shock absorbing mechanism, the combination with a pair of end friction elements and a pair of lateral friction elements, said pairs of friction elements having opposed sets of faces extending at angles to the line of relative movement between said end elements, said opposed faces being provided with alined grooves, wearing inserts detachably disposed between said opposed faces and positioned in said grooves, each insert having portions thereof coöperable with two different sets of said opposed surfaces extending at angles to the line of relative movement of said end friction elements, and spring means for yieldingly resisting relative movement between said friction elements.

3. In a friction draft rigging, the combination with draft sills, stop-acting means, draw bar and yoke-acting means, of front and rear followers each provided on its inner side with a pair of converging faces, said faces being arranged at an acute angle to the center line of the draft rigging, a pair of laterally movable friction blocks having inclined end faces corresponding to said faces of the end followers, the opposed faces of said followers and blocks being provided with alined grooves, hardened bar inserts positioned in the said grooves, each insert extending on both sides of the intersecting angle of the said faces of the followers, and transversely disposed springs for yieldingly resisting lateral separation of said friction blocks.

In witness that I claim the foregoing I have hereunto subscribed my name this 10th day of Oct., 1919.

JOHN F. O'CONNOR.